Figure 10:
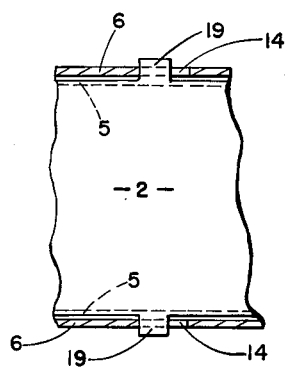

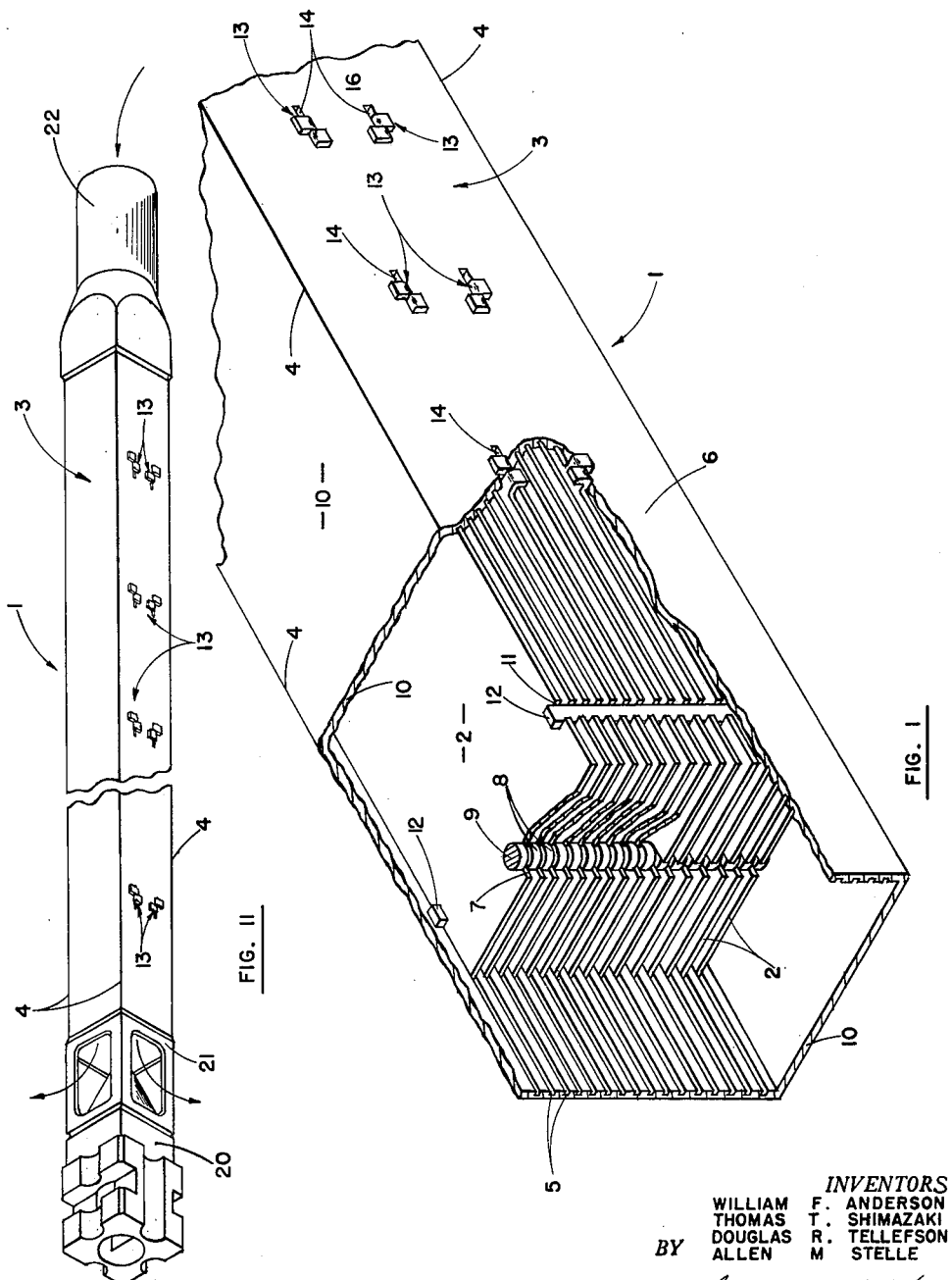

April 10, 1962  W. F. ANDERSON ETAL  3,029,198
NUCLEAR REACTOR FUEL ELEMENT
Filed Sept. 25, 1957  2 Sheets-Sheet 2

INVENTORS
WILLIAM F. ANDERSON
THOMAS T. SHIMAZAKI
DOUGLAS R. TELLEFSON
ALLEN M. STELLE
BY
Gerald A. Koris
ATTORNEY 3,029,198
NUCLEAR REACTOR FUEL ELEMENT
William F. Anderson, Canoga Park, Thomas T. Shimazaki, Los Angeles, and Allen M. Stelle, Calabasas, Calif., and Douglas R. Tellefson, Spokane, Wash., assignors, by mesne assignments, to the United States of America as represented by the United States Atomic Energy Commission
Filed Sept. 25, 1957, Ser. No. 686,089
11 Claims. (Cl. 204—193.2)

Our invention relates to a nuclear reactor fuel element, and more particularly to an improved fuel element for an organic moderated reactor.

For a detailed description of an organic moderated reactor, reference is made to Reports NAA-SR-1700 and TID-7525, available from the Office of Technical Services, Department of Commerce, Washington 25, D.C., and Report NAA-SR-Memo 1667, available from the U.S. Atomic Energy Commission.

Heretofore, plate or MTR-type fuel elements have been considered for organic moderated reactors. For information concerning the plate type fuel element and its method of fabrication, attention is invited to the Geneva Conference paper of J. E. Cunningham and E. J. Boyle entitled "MTR-Type Fuel Elements" ("The Proceedings of the International Conference on the Peaceful Uses of Atomic Energy," Geneva, Switzerland, August 1955; available for sale from the United Nations Book Store, New York, New York), and to "Research Reactors," pages 97–99 and 166–167, available for sale by the Superintendent of Documents, Washington, D.C. The typical plate-type fuel element comprises a plurality of long, slightly curved or flat plates, each plate comprising a core of uranium-aluminum alloy, uranium metal, or a sintered compact of $UO_2$-stainless steel, and a thin cladding of aluminum or stainless steel, resulting in a sandwich-type construction. The cladding is used to retain fission products in the fuel and to protect the uranium from corrosion or other damage by the coolant. The plates are assembled into a hollow, rectangular, box-like frame to form a composite fuel element. The plates are welded or brazed to the supporting frame, which gives a mechanically rigid assembly.

A disadvantage of the current plate fuel element is that heat generated in fuel plates results in the plates maintaining a higher temperature than the bulk temperature of the coolant. The structural parts of the fuel element, wherein no heat is generated, will remain at the bulk temperature of the coolant. The restrained differential expansion resulting from the temperature difference between these parts can result in serious thermal stress problems. Thermal stress problems are not experienced to any great extent when the rigidly assembled fuel element is used with a coolant of relatively good heat transfer characteristics, such as water. However, when such a fuel element is employed in an organic moderated reactor, severe thermal stress problems are experienced due to the poor heat transfer characteristics of organic as compared with aqueous coolants. If the thermal gradients are uncompensated for, severe stresses result, leading to distortions, hot spots and even fuel element failure. Without a satisfactory fuel element which can overcome these problems, the successful operation of an organic moderated reactor is seriously jeopardized.

An object of our present invention, therefore, is to provide an improved reactor fuel element.

Another object is to provide an improved reactor fuel element for an organic moderated reactor.

Another object is to provide an improved plate-type fuel element for an organic moderated reactor.

Still another object is to provide such a fuel element wherein thermal stress problems will be minimized.

Yet another object is to provide such a fuel element wherein differential expansion may be accommodated without distortion, hotspots, or other conditions leading to fuel element failure.

Yet further objects and advantages of our invention will become apparent from the following detailed description, taken together with the accompanying drawings and the attached claims.

Figure 8:
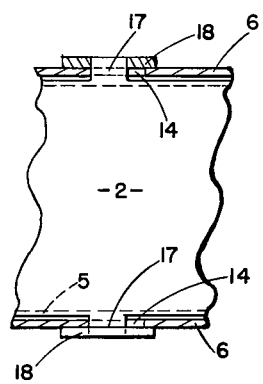
Figure 6:
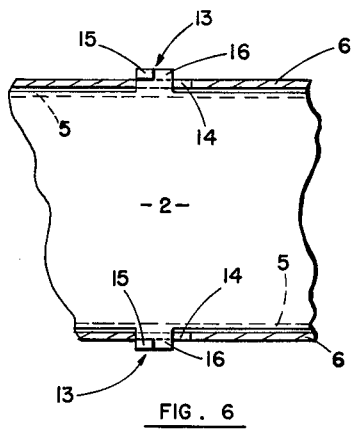
Figure 9:
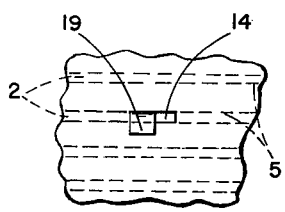
Figure 7:
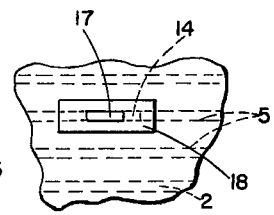
Figure 5:
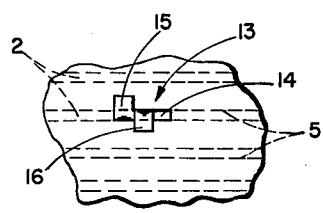
Figure 3:
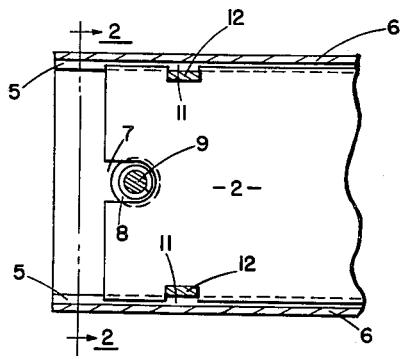
Figure 4:
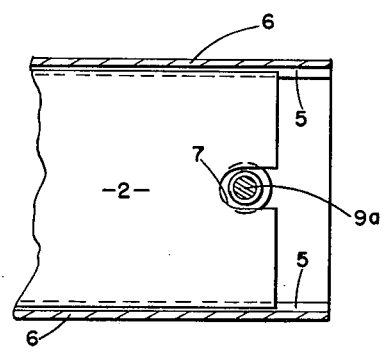
Figure 2:
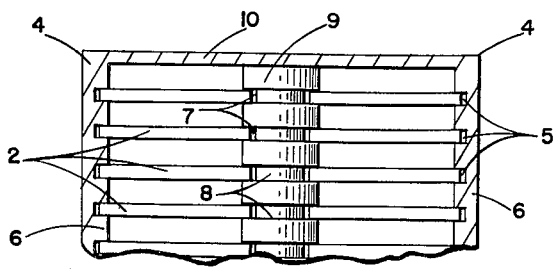

In the drawings, FIGURE 1 is an isometric view of our fuel assembly; FIGURE 2 is an end view; FIGURES 3 and 4 are plan views; FIGURES 5 and 6 are a side elevation and section of the fuel tabs shown in FIGURE 1; FIGURES 7 and 8 are an elevation and section of an alternate tab design; FIGURES 9 and 10 are an elevation and section of still another alternate tab design; and FIGURE 11 is an elevation view of a complete fuel element.

Referring now to FIGURE 1, the active fuel assembly 1 consists of fuel plates 2 supported in a hollow, rectangular housing or frame 3. The frame 3 is assembled by heliarc seam welding at the edges 4. The plates are positioned parallel to one another and run in parallel, longitudinal grooves 5 in the side plates 6 of frame 3. A clearance of a few mils is provided between the edges of fuel plates 1 and the seat of grooves 5 to allow for the expected lateral growth at power. The plates 2 have U-shaped notches 7 to fit into the grooves 8 of pin 9, vertical to the longitudinal axis of plates 2, which is welded to the top and bottom plates 10 of frame 3. Although the plates may actually touch pin 9, a clearance of a few mils is provided for longitudinal growth. A similar pin 9 is located at the other end of fuel plates 2. The end view of FIGURE 2 shows the positions of plates about pin 9.

The plates are also provided with rectangular notches 11 to fit snugly on two vertical bars 12 positioned vertically to top and bottom plates 10. The bars 12 are welded to side plates 6. These bars are not repeated at the other end of fuel assembly 1. The bars 12 secure and fix fuel plates 2 at their end. That is, the bars restrain thermal growth of the fuel plates at the one end; all growth is therefore primarily directed ahead of bars 12 towards the other end of the fuel plates. The bars also bear any load that would be directed against pin 9. This is seen more clearly in the plan views of FIGURES 3 and 4. In FIGURE 3, fuel plate 2 is in contact with bars 12 and the notches 7 are located very closely to the vertical pin 9, providing little room for expansion. However, in FIGURE 4, we note the other end of fuel plate 2 is not provided with vertical restraining bars and is positioned behind vertical pin 9a a greater distance to permit the expected longitudinal growth of the fuel plates in the direction of pin 9a, away from restraining bars 12 and pin 9, as explained above.

There is typically a fairly substantial pressure difference (e.g., 7 lbs. p.s.i.) between the inside and outside of the fuel element. This arises from the coolant flow through the fuel element being substantially greater than around the fuel element. Because the fuel plates are not rigidly attached to the side plates, the result could be expansion of the frame and dropping of fuel plates. How we have overcome this can be seen by referring back to FIGURE 1 again. It is seen that two of the plates are provided with rectangular tabs 13 which pass through slots 14 in side plates 6 and are folded back thereupon. Each tab 13 is split into two oppositely-folded portions; one 15 is floded up and the other 16 down against side plates 6. The tabs 13 are an integral part of this fuel plate and couple the supporting frame 3 with all fuel plates 2, maintain physical contact between the plates and frame and restrain any deformation upon expansion of the plates. The tabs 13 fit snugly against side plates 6 on the bar side of the frame; the slots 14, then, are ahead of the tabs in the direction of growth toward pin 9a. The difference in length between slot 14 and the width of tab 13, as is the case with all clearances, is equal to the expected differential expansion between the length of the fuel plates and the side plates. While the number of tabs may satisfactorily vary, in a typical full fuel assembly, of about four feet length, 12 tabs are placed on each of the two fuel plates bearing tabs on each side plate. This gives a total of 24 tabs per side plate.

The tab of FIGURE 1 is shown in a partial side elevation view in FIGURE 5, and in section FIGURE 6. Alternate tab designs may also be used. For example, in the partial side elevation of FIGURE 7 and the corresponding section of FIGURE 8, is shown a tab 17 which is fastened to side plates 6 by a separate button 18 which is welded to side plates 6. In FIGURES 9 and 10, a single tab 19 is used.

The fuel plate itself is prepared and may be composed of materials and methods known in the art. Typically, the plate contains a central core of fissionable material, such as uranium metal, uranium-aluminum alloy, or a sintered compact of uranium oxide and stainless steel. The core is clad with outer layers of aluminum metal, stainless steel or zirconium. The cladding is applied by hot rolling on the centrally located core.

FIGURE 11 is an elevation view of the entire fuel element showing the fuel bearing assembly 1 of FIGURE 1. Also shown are a head extension piece 20 on to which grappling devices may be fixed for inserting and removing the fuel element from the reactor, a flow diverter 21, and a tapered bottom end piece 22 for inserting the fuel element in the bottom grid plate or other equivalent means of the reactor for holding the fuel elements. The bottom end piece 22 is hollow to permit the organic coolant to pass through it into the fuel element, parallel to fuel plates 2, and then out through flow diverters in the manner indicated by the arrows. The active assembly 1 is welded to bottom piece 22, and to the flow diverter 21; the diverter is welded to head extension 20. The end of the fuel assembly with the restraining bars 12 is positioned adjacent bottom end piece 22. In this manner, the growth of the fuel plates will be in the direction of the coolant flow, that is, from the bottom of the reactor upwardly.

The following table is offered as a specific example of a representative set of dimensions of our fuel element. These dimensions are those of our fuel element as actually employed in the Organic Moderated Reactor Experiment reactor referred to in the above publications.

*Fuel Element Dimensions*

| | |
|---|---|
| Overall length | 60⅛ in. |
| Frame | Heliarc seam welded. |
|    Length | 42 in. |
|    Width | 2.8 in. |
|    Height | Do. |
|    Top Plates | 35 mils. |
|    Side plates | 50 mils. |
|       Groove width | 30 mils. |
|       Groove height | 34 mils. |
|       Distance between fuel plates | 134 mils. |
|    Material | 304 stainless steel. |
| Fuel plates: | |
|    Number/fuel element | 16. |
|    Plate length | 38 in. |
|    Plate width | 2.76 in. |
|    Clearance in grooves | 4 mils. |
|    Plate thickness | 30 mils. |
|       Core | 20 mils. |
|       Cladding | 5 mils/side—304 stainless steel. |
|    Core dimensions— | |
|       Core width | 2.5 inches. |
|       Core length | 36 inches. |
|    Core composition— | |
|       $UO_2$ | 25 wt. percent. |
|       304 stainless steel | 75 wt. percent. |
|    Uranium enrichment | ~90% U-235. |
| Bars | 2 bars—opposed and vertical to fuel plates; welded to side plates. |
|    Length | 2.836 in. |
|    Width | ¼ in. |
|    Depth | 4/10 in. |
|    Longitudinal distance between bars and adjacent pin | ½ in. |
| Pins | 2 pins—at either end of fuel plates at the mid-plane spot welded to top and bottom plate. |
|    Length | 2.836 in. |
|    Diameter | ⅜ in. |
|    Diameter at grooves | ¼ in. |
|    Groove height | 34 mils. |
|    Clearance around fuel plate: | |
|       Pin adjacent bars | 10 mils. |
|       Pin at free end | ¼ in. |
| Tabs | 12 tabs each side plate. |
|    Width | ¼ in.—split. |
|    Thickness | 34 mils. |
|    Slot | ½ in. |
| Head extension | 7 in. |
| Flow diverter | 5¾ in. |
| Bottom end piece | Do. |
| Number fuel elements in reactor | 25. |

The above example is merely illustrative and not restrictive of our invention which is inherently broad. Therefore, our invention should be understood to be limited only as is indicated by the appended claims.

Having described our invention we claim:

1. A reactor fuel element comprising in combination a plurality of fuel plates, a frame, means for slidably supporting said fuel plates in said frame in parallel spaced relationship, means at one end of said fuel plates for rigidly interconnecting said fuel plates and said frame, means at the other end of said fuel plates for floatingly supporting said fuel plates.

2. A reactor fuel element comprising in combination a plurality of fuel plates, a frame, means on said frame for supporting said fuel plates in parallel spaced relationship, said means porviding for relative longitudinal movement of said plates, means at one end of said fuel plates rigidly interconnecting said plates and said frame, means slidably engaging the other end of said fuel plates for accommodating longitudinal expansion of said fuel plates relative to said frame and said second-named means.

3. The reactor fuel element of claim 2 including means on the edges of a portion of said fuel plates for floatingly interconnecting said portion with the sides of said frame so that lateral displacement of said sides relative to said plates is prevented.

4. The reactor fuel element of claim 2 including means slidably engaging said fuel plates for maintaining the parallel spaced relationship of said fuel plates, said means being located intermediate the sides of said fuel plates and at the said one end of said fuel plates.

5. A reactor fuel element comprising in combination a plurality of fuel plates, a frame, said frame including side plates, means on said side plates for supporting the edges of said fuel plates in parallel spaced relationship, said means supporting said fuel plates in longitudinally slidable relationship with said frame, means at one end of said fuel plates rigidly interconnecting said fuel plates and said frame, means slidably engaging the other end of said fuel plates intermediate their sides for accommodating longitudinal expansion of said fuel plates and maintaining said parallel spaced relationship, and means floatingly interconnecting the sides of a portion of said fuel plates with said frame side plates for maintaining the position of said first-named means.

6. A reactor fuel element comprising a plurality of fuel plates, a hollow rectangular frame, said frame having parallel, longitudinal internal grooves in opposites sides thereof, said plates being floatingly mounted in said grooves, a plurality of said fuel plates being provided with a plurality of tabs, a plurality of slots in said grooved sides of said frame, said tabs being positioned in said slots to couple with the exterior of said frame, a recess at the longitudinal ends of said plates, a pin at each end of said fuel plates, said pins being vertically positioned to said plates in said recesses, said pins having a plurality of radial grooves, said fuel plates being non-rigidly held by said pins.

7. The fuel element of claim 6 wherein restraining means are provided at one end of said fuel plates, said restraining means directing any growth of said fuel plates substantially uni-directionally thereahead.

8. A reactor fuel element comprising a plurality of fuel plates, a hollow rectangular frame, said frame non-rigidly supporting said plates in spaced, parallel relationship, a plurality of said fuel plates being provided with a plurality of tabs, a plurality of slots in said frame, said tabs fitting in said slots and coupling to the exterior of said frame, a pin provided at each end of said fuel plates, said pins being vertically positioned to said plates and non-rigidly holding said plates, a bar disposed at each lateral edge of said fuel plates adjacent one said pin, said bars being vertically positioned to said plates, said bars rigidly holding said plates, thereby directing any fuel plate growth substantially toward the second, non-adjacent said pin.

9. The fuel element of claim 8 wherein said pin adjacent to said bar is positioned closely to said plates, and wherein said non-adjacent pin is positioned relatively less closely to said fuel plates, thereby permitting accommodation of fuel plate growth directed thereto.

10. A fuel element for an organic moderated reactor comprising a hollow rectangular frame, a plurality of parallel, longitudinal internal grooves on opposite sides of said frame, a plurality of fuel plates floatingly mounted in said grooves, a plurality of tabs at the lateral edges of said fuel plates, a plurality of slots in said grooved sides of said frame, said tabs fitting in said slots and folded back upon the exterior of said frame, a recess at each longitudinal end of said fuel plates, a first pin positioned in one said recess vertically to said plates, said pin having a plurality of radial grooves, said plates being floatingly mounted in said grooves of said pin, a second said pin in the other said recess, said fuel plates being mounted thereon relatively tighter than on said first pin, a recess in each lateral edge of said fuel plates adjacent said second pin, a bar positioned in each said lateral recess vertically to said plates, said plates being rigidly mounted on said bars, thereby directing expansion of said fuel plates in a direction towards said first pin.

11. The fuel element of claim 10 wherein said frame is comprised of stainless steel, and said fuel plates are comprised of a core of a sintered uranium dioxide stainless steel compact and cladding of stainless steel upon said core.

References Cited in the file of this patent

UNITED STATES PATENTS

| | | |
|---|---|---|
| 662,801 | Munford | Nov. 27, 1900 |
| 1,533,807 | Paterno | Apr. 14, 1925 |
| 2,804,286 | Pintarelli | Aug. 27, 1957 |
| 2,831,806 | Wigner | Apr. 22, 1958 |

FOREIGN PATENTS

| | | |
|---|---|---|
| 768,078 | Great Britain | Feb. 13, 1957 |

OTHER REFERENCES

B.M.I.-983, February 21, 1955, p. 21. Copy in Library.

TID-7506 (pt. 1), July 1956, page 70. Copy in Library. Available from Tech. Information Extension, Oak Ridge, Tenn.

NAA-SR-1800, OMRE progress report for August-October 1956, p. 14, available OTS, Dept. of Comm., Washington 25, D.C., price 65 cents. Copy in Library.

Iron and Steel Engr., November 1956, article by Nussbaum. Reprint of article available in Div. 46, 204/154.234.

TID-4562, November 1956, p. 9. Copy in Library, and Div. 46.

I.D.O.-16318, June 14, 1957, available from OTS, U.S. Dept. of Commerce, Washington 25, D.C., price 30 cents. Copy in Library.

Nucleonics, August 1957, vol. 15, No. 8, pp. 68-71. 204/193.234.

Nucleonics, August 1957, vol. 15, No. 8, A.P.P.R. Insert.